March 2, 1954

L. C. OSBORN 2,670,963

CHUCK

Filed Nov. 2, 1950

INVENTOR
LEONARD C. OSBORN

BY *John B. Armstrong*

ATTORNEY

March 2, 1954    L. C. OSBORN    2,670,963
CHUCK

Filed Nov. 2, 1950    2 Sheets-Sheet 2

INVENTOR
LEONARD C. OSBORN

BY *John B. Armentrout*

ATTORNEY

Patented Mar. 2, 1954

2,670,963

UNITED STATES PATENT OFFICE 2,670,963

CHUCK

Leonard C. Osborn, Salt Lake City, Utah

Application November 2, 1950, Serial No. 193,573

9 Claims. (Cl. 279—53)

This invention relates to chucks and more particularly to a chuck to be attached to a vibratory machine or the like to grasp a tool or an object to be worked upon.

An outstanding object of this invention is the provision of a chuck which may be attached as to the power shaft of a vibratory, rotary, or reciprocatory machine and which chuck may grasp securely such articles as a stud to be loosened, or a tool to be actuated.

A further object of the present invention involves the provision of a practical and reliable collet assembly which is suited for power operation to grasp an article and transmit force to the same.

Another object of this invention is the provision of an adapter to be attached to a handle, the power shaft of a vibratory machine, or the like, for holding a collet assembly in a novel manner.

A further object of the present invention is the provision of a chuck which is very simple and rugged of construction and which is easily produced employing readily available materials.

Another object of the invention is the provision of an unusually effective heavy-duty chuck which is inexpensive to manufacture and extremely easy to use.

A still further object of the present invention is the provision of a chuck that is particularly useful for attachment to the power shaft of a machine to grasp the end of a stud which is to be removed, the chuck of the invention being of a construction permitting quick grasping and quick loosening such as when a great number of studs are to be removed.

With these and other objects in view, as will be apparent to those skilled in the art, the invention resides in the parts and their combination set forth in the specification and covered by the claims appended hereto. The character of the invention, however, may be best understood by reference to certain of its structural forms, as illustrated by the accompanying drawings in which:

Like reference characters denote like parts in the several figures of the drawing.

As conductive to a clearer understanding of certain features of the present invention it may be noted at this point that down through the years a great many chucks have been developed, most of them involving a set of opposed gripping jaws which are actuated toward and away from one another by cams, screws, or the like. Most of the chucks were conceived for use in attaching a tool, say a drill, to the power shaft of a rotary machine, illustratively a drill press. For that reason, many unusual structures were developed, but certain of these chucks are susceptible to becoming loose as under vibration and while a positive gripping action of the chuck still is desired. For instance, in construction or demolition work it is common to have to remove studs which are embedded for the greater portion of their lengths in concrete; this for example is done by attaching a powerful rotary machine, usually portable, to the protruding end and unscrewing it from the concrete. A similar approach is followed in removing studs from the cylinder-block of an engine such as where the studs have rusted fast over the years. The removal of studs as under the conditions just mentioned is often expedited by employing a vibrating machine, but heretofore the vibrations frequently were responsible for introducing undesired stoppages by loosening the chuck and its grip on the stud before the stud itself could be loosened. An ordinary chuck also suffers from several other deficiencies as when used in such rugged applications. In the first place, the chucks are generally tightened by use of a key and the time and strength required to tighten the jaws on a stud in that manner are sometimes prohibitive where a great many studs are to be removed. Furthermore, the power machine, although portable, is sometimes heavy enough to require that it be held in both hands, whereupon the tightening of the chuck proves difficult for one man. Of course, the falling sideways of the machine while the operator is attempting to tighten the chuck with a key could result in bending of the stud or the machine power shaft.

The chuck of the present invention overcomes the above-recited and numerous other shortcomings of previously known devices, as will be evident as the description progresses.

Figure 1:
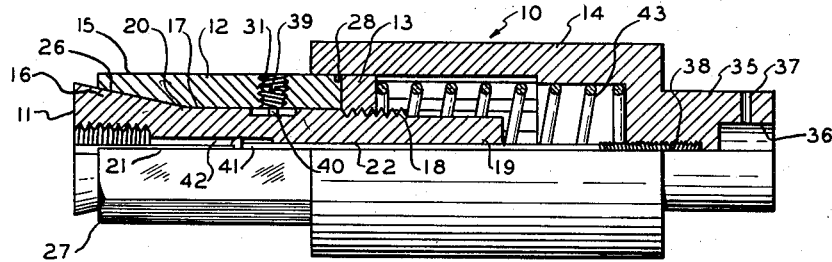
Figure 1 is a side view of a chuck constructed in accordance with the present invention, with portions of the chuck cut away to show the internal structure.

Referring first to Figure 1 which best shows the general arrangement and construction of a preferred embodiment of the invention, the chuck, generally designated 10, comprises a collet 11 within a cam sleeve 12 and in operative relationship with a nut 13. The collet 11, the cam sleeve 12, and the nut 13 are included in a collet assembly, generally designated 15. The collet assembly 15 is shown held in an adapter 14.

Figure 2:
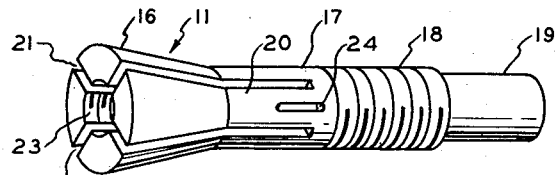
Figure 2 is a perspective view of a collet, forming a portion of the chuck in Figure 1.

Figure 2 best shows the structure of collet 11. The collet 11 is formed with a frusto-conical head 16, the smaller extremity of which merges into a generally elongated cylindrical shank 17. The intermediate portion of the shank is provided with threads 18. The free end 19 of the shank being of the diameter of the root of the thread, while the portion 20 between the threads 18 and the head 16 is of the diameter of the crest of the threads. The head 16 and a portion of the shank 17 are provided with two slots 21 each of which bisects the collet and which are at right angles to each other. An axial bore 22 having an enlarged portion 42 runs the length of the collet and a threaded counter-sunk bore 23 enters the head 16 and extends axially for the major portion of its extent. The portion 20 of the shank between the threads 18 and the head 16 is provided with a shallow longitudinal recess 24.

Figure 3:
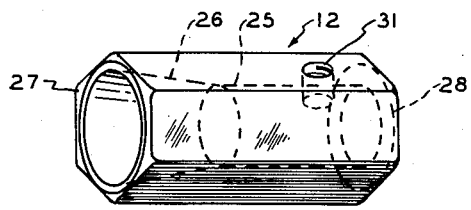
Figure 3 is a perspective view of a cam sleeve for the collet.

Figure 3 best shows the structure of the cam sleeve 12. The sleeve is of a generally elongated right-cylindrical shape of hexagonal cross-section. It is provided with an axial bore 25 having a diameter slightly greater than the diameter of the portion 20 of the shank of the collet 11. A frusto-conical bore 26 enters one end of the sleeve and extends within the sleeve a considerable distance, merging at its small end with the bore 25. The end of the sleeve from which the bore 26 enters is beveled at 27 in the same manner as is common with the external sides of nuts, while the other end of the sleeve is formed with a washer face 28, as is also common with machine nuts. The sleeve 12 is further provided in its intermediate portion with a threaded set-screw aperture 31 running through the sleeve into the bore 25.

Figure 4:
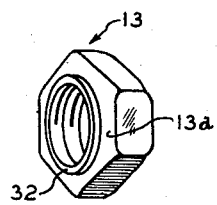
Figure 4 is a perspective view of a nut for the collet shank.

Figure 4 best shows the nut 13 which forms part of the collet assembly. For the most part it is a common machine nut having a threaded bore 32 such as will thread onto the threads 18 on the shank of the collet 11. It has a hexagonal outer surface of the same size in cross section as the outer surface of sleeve 12. That portion of the nut which abuts the adjacent end of sleeve 12 advantageously is in the form of a narrow annular ring 13a which introduces only a small amount of friction between itself and the sleeve 12, thus to promote ease of relative rotation between the sleeve and nut.

Figure 5:
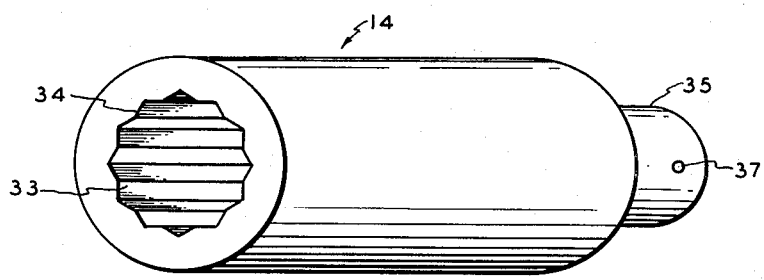
Figure 5 is a perspective view of an adapter of the chuck.

Figure 5 best illustrates the form and structure of the adapter 14. It is of a generally right-circular cylindrical form and is provided with an axial recess 33 entering one end of the adapter. The sides of the recess are provided for most of its length with a number of serrations 34 which give the cross-section of the recess a star-like appearance. The recess has preferably twelve such serrations after the manner of a socket wrench and the recess size and shape is such as to admit the hexagonal sleeve 12 and the nut 13 slidably, but non-rotatably. The other end of the adapter is provided with a neck 35, the outer end of which has a re-entrant axial bore 36 and a pin hole 37 entering the bore at right angles to the latter. The bore 36 conveniently is of the same diameter as the power shaft of the vibratory machine or other shaft or handle means with which the invention is to be practiced. A threaded bore 38 enters the back wall of the recess 33 and extends axially a short distance into the neck 35.

Returning again to Figure 1, it will be seen that the collet assembly 15 is made up with the shank 17 of the collet 11 extending through the bore 25 of the sleeve 12 with the head 16 of the collet resting against the conical surface of the recess 26 of the sleeve. A set screw 39 is threaded into the set-screw aperture 31 as with a reduced end 40 extending into the recess 24 in the shank of the collet. The nut 13 is threaded onto the shank of the collet. The collet assembly 15 is shown resting in the recess 33 of the adapter 14 with the hexagonal surfaces of the sleeve 12 and the nut 13 mating slidably but non-rotatably with the surface of the recess. A thin, elongated bolt 41 extends through the bore 22 in the collet with its head remaining in the enlarged portion 42 of the bore; the other end of the bolt is threaded into the threaded bore wall 38 at the back of the adapter. A coil spring 43 in the recess 33 is normally compressed between the back of the recess and the nut 13, thus biasing the collet assembly 15 in favor of movement out of the recess 33. The bolt 41, however, is so proportioned in length that the collet assembly is permitted to leave the recess only to the extent necessary to free the sleeve 12 of the non-rotative restriction of the serrations 34 in the sides of the recess.

When used with a rotative machine for pulling studs, the device of the invention illustratively serves in the following manner. The power shaft of the machine is inserted in the bore 36 in the neck of the adapter and is locked therein by the insertion of a pin (not shown) into the pin hole 37 and into a matching aperture in the power shaft. The threaded bore 23 in the collet 11 is of a size and preferably is so threaded as to fit onto the threaded end of the stud being acted upon. The machine and the chuck are placed over the stud and no pressure is placed on the chuck to compress the spring 43; the sleeve 12 is then entirely free of the adapter, but the nut 13 remains within the adapter. When the machine is actuated, the power shaft and the chuck turn and the stud threads into the bore 23 in the collet. When the stud has threaded to the back of the bore 23, it can go no farther and the collet is held from turning. When the collet remains fixed with respect to the article to be grasped, the sleeve 12 also remains so fixed and vice versa, because the collet and sleeve are keyed together by the set screw 39 and the recess 24. If the article to be grasped is not fixed, as is in the case of a tool or the like, the collet and sleeve are held as by placing a wrench over the hexagonal surface of the sleeve. In any case, the article to be grasped, the collet and the sleeve illustratively are held fixed while the adapter and the nut 13 rotate with the power shaft of the machine. This relative rotation of the nut and the collet causes the nut to move along the shank of the collet and to press against the sleeve 12. The sleeve is free to move longitudinally but not rotatably with respect to the collet and proceeds to do so. The frusto-conical head 10 of the collet is pulled into the recess in the sleeve, the head being thus compressed radially. The slots 21 allow the head to be compressed resiliently and the threaded faces of the bore 23 grasp the article firmly. The machine is then stopped and axial pressure brought to bear on the machine compresses the spring 43 and allows the sleeve 12 to enter the adapter, whereupon the nut and sleeve are locked against relative rotation. The collet and the stud being grasped are also locked because of the tremendous friction forces set up between the elements. Then the machine may be set in motion to bring about the desired movement of the article grasped. In the case of a "frozen" stud, the machine illustratively affords vibration to assist unscrewing the stud. This vibration cannot impair the grip of the collet on the stud, for the sleeve 12 and the nut 13 are positively interlocked by adapter 14 to prevent alteration of the grip. The collet can be freed of the stud by removing the axial pressure so that spring 43 ejects sleeve 12 from the adapter, with nut 13 remaining engaged with the latter, and by rotating the sleeve relative to the nut as by means of a wrench applied to the outer surface of the sleeve. This rotation causes the adapter 14 to loosen the nut 13 and permits the head of the collet to expand to release the stud. The use of the low friction ring 13a between the sleeve and nut such as on the nut, lends ease of rotation of the sleeve as with the wrench.

Figure 6:
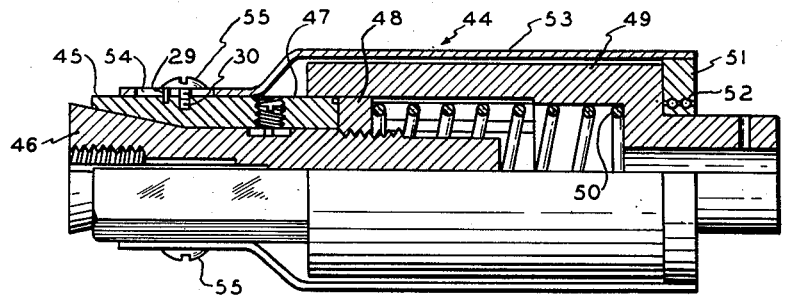
Figure 6 is a side view of a modified form of chuck also constructed in accordance with the present invention; portions being broken away to show the internal structure.

Referring now to Figure 6, wherein is shown a modified form of chuck constructed in accordance with the invention; the chuck, generally designated 44, comprises a collet assembly 45 and an adapter 49. The collet assembly comprises a collet 46, a cam sleeve 47, and a nut 48. The collet 46 conveniently is the same as collet 11 shown in Figure 2, except that the axial bore 22 is not necessary in this case. The cam sleeve 47 is similar to the sleeve 12 shown in Figure 3 and used in the modification represented in Figure 1, except that two opposite flats of the hexagonal surface are provided in the central portion with short pins 29 and threaded apertures 30. The nut 48 is exactly the same as the nut 13 of Figure 4. The adapter 49 is similar to the adapter 14 shown in Figure 5, except that the threaded bore 38 is not necessary. As in the modification of Figure 1, the collet 46 carries the sleeve 47 and the two are held together by the nut 48 keyed against relative rotation by a set screw and a recess. The collet assembly 45 is held in the adapter 49 and is biased outwardly by a coil spring 50. However, an entirely differerent means is used to limit the movement of the collet assembly outwardly of adapter 49. In place of the bolt used in the modification of Figure 1, the present modification is provided with a ring 51 rotatably carried on the neck of the adapter by means of roller bearings 52. Welded or otherwise attached to diametrically opposite portions of the ring are arms 53. These arms extend along the surface of the adapter and are bent inwardly to the surfaces of the cam sleeve 47 which are provided with the pins 29 and the threaded apertures 30. The portions of the arms 53 which lie along the sleeve are provided with longitudinal slots 54 within which the pins 29 are enclosed. The arms are held against the surfaces of the sleeve by bolts 55 which reside in the threaded apertures 30 and have large, broad heads which bear against the surfaces of the arms adjacent to the slots. The arms and their slots are of such a size and are so situated as to allow the collet assembly to slide freely from a position where the sleeve is wholly outside the adapter to a position where the sleeve is well within the adapter. Because the ring is rotatably disposed on the neck of the adapter, the ring and the arms are free to rotate with the collet assembly with respect to the adapter. The use of this modification illustratively is the same as has been described above in connection with the chuck shown in Figure 1.

As many possible embodiments may be made of this invention and as many changes may be made in the embodiments hereinbefore set forth, it will be understood that all matter described herein is to be interpreted as illustrative and not as a limitation.

Embodiments of the invention having thus been described, what is claimed as new and desired to secure by Letters Patent is:

1. A chuck, comprising a collet having a shank and jaws at one end of said shank, cam means for sliding in opposite directions on said shank respectively to urge said jaws closed and to release the same in favor of opening, rotatable means for moving said cam means in one direction and said collet in the opposite direction for said cam means to close said jaws by thrust application and for relieving said cam means to open said jaws, and means engaging said rotatable means for setting the same to position corresponding to desired position of said collet jaws and for locking said rotatable means and said cam means together for rotation in unison with said collet in both directions of rotation to maintain a closed setting of said collet jaws.

2. A chuck, comprising a collet having a shank and jaws at one end of said shank, cam means on said shank for relative movement in opposite directions longitudinally thereof respectively to urge said jaws closed and to release the same in favor of opening, rotatable means threaded on said collet shank to apply and release thrust to said cam means thus to achieve the opening and closing of said collet jaws, and rotary adapter means for setting said rotatable means to position corresponding to desired position of said collet jaws and for locking said rotatable means and said cam means together for rotation in unison with said collet, both directions of rotation to maintain a closed setting of said collet jaws.

3. A chuck, comprising an adapter having a non-circular axial recess therein, a nut slidably and non-rotatably disposed in the recess of said adapter and having a threaded axial bore therethrough, a sleeve of such a cross-sectional shape as to slide non-rotatably within the recess and having an axial bore at least a portion of which has a conical surface, a collet having a conical head and a threaded shank so situated that the conical head of the collet rests against the conical portion of the sleeve and said threaded shank of the collet is engaged with the threaded bore of the nut, the head of the collet being suited to grasp an article, the collet, sleeve, and nut forming an assembly, means resiliently biasing said assembly outwardly of the recess, and means limiting the movement of the sleeve in said assembly to outside the recess so that the nut resides in said recess.

4. A chuck, comprising an adapter having a non-circular axial recess, a nut slidably and non-rotatably disposed in said recess and having a threaded axial bore therethrough, a sleeve having the same cross-sectional size and shape as said nut and having a bore at least a portion of which has a conical surface, a collet having a split conical head and a threaded shank, the collet, sleeve, and nut forming a collet assembly with the conical head of the collet lying within the conical portion of the bore in the sleeve and the threaded shank of the collet engaging the threaded bore of the nut, the collet assembly being resiliently biased outwardly of the recess, and means limiting the movement of the sleeve in said assembly to outside said recess so that the nut resides in said recess.

5. A chuck, comprising an adapter having a non-circular recess therein, a nut slidably and non-rotatably disposed in the recess of said adapter and having a threaded axial bore therethrough, a sleeve of such cross-sectional shape as to slide non-rotatably within the recess and having an axial bore at least a portion of which has a conical surface, a collet having a conical head and a threaded shank so situated that the conical head of the collet rests against the conical portion of the sleeve and said threaded shank of the collet is engaged with the threaded bore of the nut, the head of the collet being suited to grasp an article, the collet, sleeve and nut forming an assembly, a spring in said adapter recess resiliently biasing said assembly outward of the adapter, and means limiting the movement of the collet assembly to outside said recess to a position where the sleeve is rotatably free of said adapter and said nut is engaged within the recess, the collet assembly being capable of being moved against the action of said biasing spring to a position where the nut and sleeve are engaged within said recess.

6. A chuck, comprising a collet having a split and axially countersunk conical head and a threaded shank, a nut having a threaded bore therethrough, a sleeve having a bore at least a portion of which has a conical surface, the collet, sleeve, and nut forming a collet assembly with the conical head of the collet lying within the conical portion of the bore in the sleeve and the threaded shank of the collet engaging the threaded bore of the nut, an adapter having an axial recess for receiving the sleeve and nut slidably but non-rotatably, a spring in said adapter recess biasing the collet assembly outwardly of the adapter and means limiting the movement of the collet assembly outwardly of the recess.

7. A chuck comprising a collet having a split and axially recessed conical head, a threaded shank, and an axial bore running from the recess completely through the shank, a nut having a threaded axial bore therethrough, a sleeve having a bore at least a portion of which has a conical surface, the collet, sleeve, and nut forming a collet assembly with the conical head of the collet lying within the conical portion of the bore in the sleeve and the threaded shank of the collet engaging the threaded bore of the nut, an adapter having an axial recess receiving the sleeve and nut slidably but non-rotatably, the back wall of said recess having a threaded bore wall, a spring biasing the collet assembly outwardly of the recess, an elongated bolt having its head residing in the recess in the collet, and its body passing through the axial bore of the collet and threaded into the threaded bore wall in the back wall of the recess in the adapter, said bolt limiting the movement of the collet assembly outwardly of the recess.

8. A chuck, comprising a collet having a split and axially recessed conical head and a threaded shank, a nut having a threaded bore therethrough, a sleeve having a bore at least a portion of which has a conical surface, the collet, sleeve, and nut forming a collet assembly with the conical head of the collet lying within the conical portion of the bore in the sleeve and the threaded shank of the collet engaging the threaded bore of the nut, an adapter having a reduced neck portion at one end and having at the other end an axial recess receiving the sleeve and nut slidably but non-rotatably, a spring biasing the collet assembly outwardly of the recess, a ring rotatably mounted on the reduced neck portion of the adapter, arms carried by said ring and attached to the sleeve, the attachment of the arms to the sleeve being effected by bolts in said sleeve and through elongated slots in said arms for limiting the movement of the collet assembly outwardly of the recess.

9. A chuck, comprising a collet having a shank and jaws at one end of said shank, cam means for sliding in opposite directions on said shank respectively to urge said jaws closed and to release the same in favor of opening, rotatable means for moving said cam means in one direction and said collet in the opposite direction for said cam means to close said jaws by thrust application and for relieving said cam means to open said jaws, means engaging said rotatable means for setting the same to position corresponding to desired position of said collet jaws and movable for locking said rotatable means and said cam means together for rotation in unison with said collet in both directions of rotation to maintain a closed setting of said collet jaws, and means for biasing said setting and locking means to the setting position wherein said rotatable means is engaged by the same and said cam means is excluded from the engagement.

LEONARD C. OSBORN.

References Cited in the file of this patent

UNITED STATES PATENTS

| Number | Name | Date |
|---|---|---|
| 1,338,576 | Keys | Apr. 27, 1920 |
| 2,430,761 | Duphety | Nov. 11, 1947 |
| 2,431,594 | Wernig | Nov. 25, 1947 |
| 2,513,213 | Schick | June 27, 1950 |